United States Patent [19]

Fujinawa et al.

[11] Patent Number: 5,694,129
[45] Date of Patent: Dec. 2, 1997

[54] METHOD OF IMMINENT EARTHQUAKE PREDICTION BY OBSERVATION OF ELECTROMAGNETIC FIELD AND SYSTEM FOR CARRYING OUT THE SAME

[75] Inventors: Yukio Fujinawa, Tsukuba; Kozo Takahashi, Higashi-Kurume, both of Japan

[73] Assignees: Science and Technology Agency National Research Institute for Earth Science and Disaster Prevention, Tsukuba; Ministry of Posts and Telecommunications Communications Research Laboratory, Koganei, both of Japan

[21] Appl. No.: 520,671

[22] Filed: Aug. 29, 1995

[51] Int. Cl.$^6$ .......................... G01S 13/88; G01V 3/12; G01V 3/38

[52] U.S. Cl. .................. 342/22; 324/348; 340/690

[58] Field of Search .................... 342/22; 367/13, 367/14; 324/323, 348; 340/690

[56] References Cited

U.S. PATENT DOCUMENTS

| | | | |
|---|---|---|---|
| 4,066,992 | 1/1978 | Buller et al. | 340/690 |
| 4,612,506 | 9/1986 | Varotsos et al. | 324/348 |
| 4,884,030 | 11/1989 | Naville et al. | 340/690 |
| 4,904,943 | 2/1990 | Takahashi | 324/348 |
| 5,521,508 | 5/1996 | Merzer | 324/345 |

OTHER PUBLICATIONS

Fujinawa et al, "ULF Underground Electric Field VAriations as Imminent Precursors of Earthquakes," Earthquake Journal, vol. 43, pp. 287–290, Jun. 1990.

Takahashi et al, "Locating source regions of pre-cursory seismo-electric fields and the mechanism generating electric field variations," Phy. Earth Planet. Inter. (Neatherlands) vol. 77, No. 1–2, pp. 33–38, Apr. 1993.

*Primary Examiner*—Ian J. Lobo
*Attorney, Agent, or Firm*—Armstrong, Westerman, Hattori, McLeland & Naughton

[57] ABSTRACT

A seismic electromagnetic field signal is detected at each of observation stations installed at at least two places, and civil noise and atmospheric discharge noise are eliminated from the signal to obtain a low-frequency seismic electromagnetic field signal $O_r$. A local characteristic signal $C_e$ and a refined local characteristic signal $C_f$ are obtained by processing the signal $O_r$. The signals $O_r$, $C_e$ and $C_f$ are transmitted to a central station. At the central station, a delay time T and a half-width H are obtained from the cross-correlation function between the observation stations, and further a regional characteristic signal $C_r$ is obtained from the seismic electromagnetic field signal $O_r$. An earthquake source region distribution, an earthquake magnitude, and earthquake occurrence time are estimated on the basis of the signals obtained at the central station and the local characteristic signal $C_e$ and refined local characteristic signal $C_f$ obtained at each observation station.

10 Claims, 8 Drawing Sheets

Observation point

○ : Seismic electro-magnetic signal
× : Noise

METHOD OF IMMINENT EARTHQUAKE PREDICTION BY OBSERVATION OF ELECTROMAGNETIC FIELD AND SYSTEM FOR CARRYING OUT THE SAME

BACKGROUND OF THE INVENTION

The present invention relates to a method of imminent earthquake prediction by observation of electromagnetic field, whereby the three fundamental elements of earthquake prediction, that is, occurrence time, location and magnitude of an earthquake, can be predicted from several days to several hours before the earthquake on the basis of seismic electromagnetic field signals which are observed before the occurrence of the earthquake. The present invention also relates to a system for carrying out the imminent earthquake prediction method.

Earthquake predictions may be roughly divided into four types: long-term predictions which are made in units of several tens of years; intermediate-term predictions made in units of several years; short-term predictions aiming at predicting an earthquake from several months to several tens of days before the occurrence; and imminent predictions aiming at predicting an earthquake from several days to several hours before the occurrence.

Conventional short-term earthquake predictions by means of electromagnetic measurements have been mainly tried in Greece by a method called "VAN method". There are known inventions which propose earthquake prediction methods based on the observation of electromagnetic field. The following are three typical examples of the known methods:

"Earthquake prediction method that employs a dynamic spectrum of potential differences or radio waves" (see Japanese Patent Application Unexamined Publication (KOKAI) No. 62-103596), in which seismic precursor signals are discriminated by comparing spectra of potential differences or radio waves and changes thereof with time at two or more observation points;

"Method of observing electric field changes as a seismic precursor" (see Japanese Patent Application Post-Examination Publication No. 5-35999), in which a borehole antenna is used as a sensor for detecting a seismic electromagnetic field; and "Tomography method for obtaining a tomographic image of a source region of a long wave or an earth current as a seismic precursor" (see Japanese Patent Application Post-Examination Publication No. 5-36000), in which a tomographic image of a seismic precursor signal source region is produced on the basis of cross correlation between seismic electromagnetic field signals detected at different observation points.

Among the conventional short-term earthquake prediction methods, only the VAN method tried in Greece is estimated to be a practical earthquake prediction method. However, the VAN method is a short-term earthquake prediction method aiming at predicting an earthquake from 10 days to 40 days before the occurrence. It has been considered technically impossible to predict an earthquake imminently, that is, from several days to several hours before the occurrence; such an imminent earthquake prediction has not yet been realized. The VAN method necessitates laying electrodes at sensitive sites carefully selected in a particular region of earthquake prediction. Moreover, many experiments must be carried out to select an appropriate electrode laying method, and it is necessary to extract significant information from noise which is about 100 times as much as the desired signal. Therefore, exceedingly abundant experiments are needed to estimate an earthquake occurrence place. Further, the VAN method, which aims at short-term earthquake prediction, requires substantial consideration to put it into practical use, particularly in countries where there are many artificial noises. Furthermore, it is particularly difficult for the conventional methods, including the VAN method, to predict earthquakes imminently, that is, several hours before the occurrence.

SUMMARY OF THE INVENTION

In view of the above-described problems, an object of the present invention is to provide a method of imminent earthquake prediction by observation of an electromagnetic field, wherein seismic electromagnetic field signals having no or minimal noise are extracted, and various kinds of characteristic signals concerning the seismic electromagnetic field are obtained from the seismic electromagnetic field signals at each observation station and at a central station, and wherein the three fundamental elements of earthquake prediction, that is, occurrence time, location and magnitude of an earthquake, are practically estimated on the basis of the characteristic signals, thereby enabling an earthquake to be predicted immediately before the occurrence.

Another object of the present invention is to provide a system for carrying out the above-described imminent earthquake prediction method.

The present invention provides an imminent earthquake prediction method in which seismic electromagnetic field signals detected and processed at a plurality of observation stations are transmitted to a central station to estimate earthquake occurrence time, an earthquake occurrence place, and an earthquake magnitude, thereby making imminent earthquake prediction, the method comprising:

outputting a seismic electromagnetic field signal $O_a$ obtained by eliminating civil noise and atmospheric discharge noise from a seismic electromagnetic field signal detected with an electromagnetic field sensor of each of observation stations installed at at least two places, and arrival bearing data (d and $\Delta d$) concerning a lightning electromagnetic field signal detected by a lightning position detector on the basis of an appropriate method;

comparing the seismic electromagnetic field signal $O_a$ with the waveforms of known seismic electromagnetic field signals and extracting a noise-free seismic electromagnetic field signal $O_s$ having the same waveform as that of the seismic electromagnetic field signal outputting a local characteristic signal $C_e$, including a number of pulses present in a predetermined time interval for each amplitude level of the seismic electromagnetic field signal $O_s$, a maximum value of the signal $O_s$, and local direction distribution data ($d_{oi}$ and $\Delta d_{oi}$) obtained from arithmetic mean of the arrival bearing data (d and $\Delta d$) captured in a predetermined period of time;

outputting a refined local characteristic signal $C_f$ including a number of pulses for each amplitude level of the seismic electromagnetic field signal $O_s$ which are present in a spatial window defined by a central direction $d_s$ connecting the observation point of the observation station and a seismic electromagnetic field central position $X_0$ indicated by data sent from the central station, and a dispersion $\Delta d_s$ corresponding to the extension $X_0$ of the seismic electromagnetic field central position $X_0$, the refined local characteristic signal $C_f$ further including a maximum value of the seismic electromagnetic field signal $O_s$;

transmitting a low-frequency signal of the seismic electromagnetic field signal $O_s$, the local characteristic signal $C_e$, the refined local characteristic signal $C_f$, the arrival bearing data (d and Δd), and the local direction distribution data ($d_{oi}$ and $Δd_{oi}$), which are obtained at each of the observation stations, to the central station;

obtaining, at the central station, a cross-correlation function between the signals $O_s$ from a pair of observation points (when there are at least four observation points), smoothing the cross-correlation function, obtaining a point of time at which the smoothed cross-correlation function reaches a maximum as delay time T, and further obtaining a half-width H of the smoothed cross-correlation function;

obtaining data $X_t$ indicating a central point of a spatial distribution of seismic electromagnetic field source regions from the delay time T, together with an extension $ΔX_t$;

extracting only signals $O_s$ which are mutually present in an allowable arrival time interval $ΔT_{12}$ determined on the basis of the half-width H with regard to the data from each pair of observation points, thereby obtaining a noise-less seismic electromagnetic field signal $O_r$;

outputting a regional characteristic signal $C_r$ including a pulse number of the signal $O_r$ for each amplitude level and a maximum value of the signal $O_r$ and a seismic electromagnetic field source region central position $X_r$, extension $ΔX_r$ and intensity distribution $I_r$, which are obtained on the basis of the local direction distribution data ($d_{oi}$ and $Δd_{oi}$), as average distribution data, and further calculating and outputting an epicentral distance L from the observation point to the central position $X_r$;

calculating a weighted mean of the spatial distribution data $X_t$ and $ΔX_t$, the average distribution data $X_r$, $ΔX_r$ and $I_r$, and source region data $X_i$, $ΔX_i$ and $I_i$ calculated from the arrival bearing data (d and Δd), thereby estimating a seismic electromagnetic field source region central position $X_0$, extension $ΔX_0$ and intensity distribution $I_0$, and transmitting the central position data $X_0$ and extension $ΔX_0$ to each of the observation stations;

estimating an earthquake magnitude M on the basis of the regional characteristic signal $C_r$, local characteristic signal $C_e$, refined local characteristic signal $C_f$ and epicentral distance L, together with a quantity indicating the extension of seismic electromagnetic field source regions, which is obtained on the basis of the set of the data $X_0$ and extension $ΔX_0$; and adding empirically set time ΔT to abnormality occurrence time $T_0$ obtained on the basis of the function of time and pulse numbers of the regional characteristic signal $C_r$, the local characteristic signal $C_e$ and the refined local characteristic signal $C_f$, thereby estimating earthquake occurrence time $T_E$.

Further, the imminent earthquake prediction method of the present invention is characterized in that the estimated earthquake occurrence time $T_E$, the central position data $X_0$, extension $ΔX_0$ and intensity distribution $I_0$, and the earthquake magnitude $M_0$ are compared with meteorological data to check whether or not there is lightning, and also compared with crustal activity monitoring data to evaluate reliability of the estimated earthquake occurrence time $T_E$, the estimated earthquake occurrence central position data $X_0$, extension $ΔX_0$, and intensity distribution $I_0$, and the earthquake magnitude $M_0$.

Further, the imminent earthquake prediction method of the present invention is characterized in that a quantity indicating the extension of seismic electromagnetic field source regions, for example, a value of area, is calculated on the basis of the set of the central position data $X_0$, and extension $ΔX_0$, and a first estimate $M_1$ of earthquake magnitude is obtained on the basis of the value, and that a second estimate $M_2$ of earthquake magnitude is obtained on the basis of the pulse numbers, maximum and minimum values of the regional characteristic signal $C_r$, the local characteristic signal $C_e$ and the refined local characteristic signal $C_f$ together with the epicentral distance L, and a final earthquake magnitude $M_0$ is obtained by calculating a weighted mean of the estimates $M_1$ and $M_2$.

In addition, the present invention provides an imminent earthquake prediction system in which seismic electromagnetic field signals detected at observation stations installed at a plurality of places are processed and transmitted to a central station, and the signals are further processed at the central station to estimate earthquake occurrence time, an earthquake occurrence place, and an earthquake magnitude, thereby making imminent earthquake prediction;

wherein each of observation stations installed at at least two places includes:

a local seismic electromagnetic field discriminator for comparing a seismic electromagnetic field signal $O_a$, which is obtained by eliminating civil noise and atmospheric discharge noise from a seismic electromagnetic field signal detected with an electromagnetic field sensor of the observation station, with the waveforms of known seismic electromagnetic field signals which have previously been stored in memory, and for outputting a known seismic electromagnetic field signal having the same waveform as that of the seismic electromagnetic field signal $O_a$, and outputting a noise-less local seismic electromagnetic field signal $O_s$, the local seismic electromagnetic field discriminator further outputting arrival bearing data (d and Δd) concerning a lightning electromagnetic field signal detected by a lightning position detector on the basis of an appropriate method;

a local characteristic estimator for outputting a local characteristic signal $C_e$, including a number of pulses present in a predetermined time interval for each amplitude level of the seismic electromagnetic field signal $O_s$, and a maximum amplitude value of the signal $O_s$, and local direction distribution data ($d_{oi}$ and $Δd_{oi}$) obtained from the arithmetic mean of the arrival bearing data (d and Δd) captured in a predetermined period of time;

a refined local characteristic estimator for outputting a refined local characteristic signal $C_f$ including a number of pulses for each amplitude level of the seismic electromagnetic field signal $O_s$, which are present in a spatial window defined by a central direction connecting the observation point of the observation station, and a seismic electromagnetic field central position $X_0$ indicated by data sent from the central station, and the extension $ΔX_0$ of the seismic electromagnetic field central position $X_0$, the refined local characteristic signal $C_f$ further including a maximum value of the seismic electromagnetic field signal $O_s$; and a transmitter for transmitting a low-frequency signal $O_s$ among signals $O_s$ outputted from the local seismic electromagnetic field discriminator, the local characteristic signal $C_e$, the refined local characteristic signal $C_f$, the arrival bearing data (d and Δd), and the local direction distribution data ($d_{oi}$ and $Δd_{oi}$) to the central station; and wherein the central station includes:

a correlator for obtaining a point of time at which a smoothed cross-correlation function of the signals $O_s$ inputted from the observation stations reaches a maximum as delay time T of seismic electromagnetic field, and for obtaining a half-width B of the smoothed cross-correlation function;

a tomography builder for calculating data $X_t$ indicating a central point of a spatial distribution of seismic electromagnetic field source regions, together with an extension $\Delta X_r$ from the delay time T;

a regional seismic electromagnetic wave discriminator for extracting a plurality of signals $O_s$ which are mutually present in an allowable arrival time interval $\Delta T_{12}$ determined on the basis of the half-width H inputted thereto from the correlator, and for outputting a noise-less regional seismic electromagnetic field signal $O_r$;

a regional characteristic estimator for outputting a regional characteristic signal $C_r$ including a pulse number of the signal $O_r$ for each amplitude level and a maximum value of the signal $O_r$, seismic electromagnetic field source average distribution data $X_r$, extension $\Delta X_r$ and intensity distribution $I_r$, which are calculated from the local direction distribution data ($d_{Oi}$ and $\Delta d_{Oi}$), and for calculating and outputting an epicentral distance L from the observation station to a position indicated by the average distribution data $X_r$;

a source region distribution estimator for calculating a weighted mean of the average distribution data $X_r$, $\Delta X_r$ and $I_r$ from the regional characteristic estimator, the spatial distribution data $X_t$ and $\Delta X_t$ from the tomography builder, and source region data $X_i$, $\Delta X_i$ and $I_i$ calculated from the arrival bearing data (d and $\Delta$d), thereby estimating a seismic electromagnetic field source central position $X_O$, extension $\Delta X_O$ and intensity distribution $I_O$, and for transmitting the central position data $X_O$ and extension $\Delta X_O$ to the refined local characteristic estimator of each of the observation stations;

a device for estimating an earthquake magnitude M on the basis of a quantity, indicating the extension of seismic electromagnetic field source regions, which is obtained on the basis of the set of the central position data $X_O$, extension $X_O$, the regional characteristic signal $C_r$, the local characteristic signal $C_e$, the refined local characteristic signal $C_f$, and the epicentral distance L; and a device for estimating earthquake occurrence time $T_E$ by adding empirically known time $\Delta T$ to abnormality occurrence time $T_O$ obtained on the basis of the function of time and input pulse numbers of the characteristic signals $C_e$, $C_f$ and $C_r$.

Further, the imminent earthquake prediction system of the present invention is characterized by including a synthetic decision panel whereby the estimated earthquake occurrence time $T_E$ from the occurrence time estimator, the central position data $X_O$, extension $\Delta X_O$ and intensity distribution $I_O$ from the source region distribution estimator, and the earthquake magnitude $M_O$ from the magnitude estimator are compared with meteorological data to check whether or not there is lightning, and further compared with crustal activity monitoring data to decide reliability of the estimation of the three data items.

Further, the imminent earthquake prediction system of the present invention is characterized in that a quantity indicating the extension of seismic electromagnetic field source regions, for example, the value of area, is calculated on the basis of the set of the central position data $X_O$, and extension $\Delta X_O$, and a first estimate $M_1$ of earthquake magnitude is obtained on the basis of the above value, and that a second estimate $M_2$ of earthquake magnitude is obtained on the basis of the regional characteristic signal $C_r$, the local characteristic signal $C_e$ and the refined local characteristic signal $C_f$, together with the epicentral distance L, and a final earthquake magnitude $M_O$ is obtained by calculating a weighted mean of the estimates $M_1$ and $M_2$.

In the present invention, arranged as described above, a seismic electromagnetic field signal O is detected with a seismic electromagnetic field sensor of each of observation stations installed at at least two places and then amplified, and civil noise and lightning-induced signal are eliminated from the seismic electromagnetic field signal O to form a seismic electromagnetic field signal $O_a$. Further, lightning electromagnetic field arrival bearing data (d and $\Delta$d) is detected by the lightning position detector on the basis of an appropriate method. The signal $O_a$ and the arrival bearing data (d and $\Delta$d) are sent to the local seismic electromagnetic field discriminator. At the local seismic electromagnetic field discriminator, the input seismic electromagnetic field signal $O_a$ is compared with the waveforms of known seismic electromagnetic field signals, which have previously been stored in memory, and a seismic electromagnetic field signal $O_s$ having the same waveform as that of the signal $O_a$ is extracted and inputted to the local characteristic estimator. The local characteristic estimator outputs a local characteristic signal $C_e$ formed from the pulse number for each amplitude level of the signal $O_s$ and a maximum value thereof, and local direction distribution data ($d_{Oi}$ and $\Delta d_{Oi}$) obtained from the arithmetic mean of the arrival bearing data (d and $\Delta$d) captured in a predetermined period of time. The refined local characteristic estimator is supplied with the seismic electromagnetic field signal $O_s$ and the seismic electromagnetic field source region central position data ($X_O$ and $\Delta X_O$) transmitted from the central station. The refined local characteristic estimator outputs a refined local characteristic signal $C_f$ which is formed from the number of pulses for each amplitude level of the seismic electromagnetic field signal $O_s$, which are present in a spatial window defined by the observation point and the central position data ($X_O$ and $\Delta X_O$), and a maximum value of the signal $O_s$. The observation station transmits the seismic electromagnetic field signal O, the low-frequency seismic electromagnetic field signal $O_s$, the local characteristic signal $C_e$, the refined local characteristic signal $C_f$, the arrival bearing data (d and $\Delta$d) and the local direction distribution data ($d_{Oi}$ and $\Delta d_{Oi}$) to the central station through the transmitter. At the correlator of the central station, a point of time at which the smoothed cross-correlation function between the low-frequency signals $O_s$ inputted thereto from the observation stations reaches a maximum is obtained as delay time T, and the half-width H of the smoothed cross-correlation function is obtained. The tomography builder, which is supplied with the delay time T, obtains seismic electromagnetic field source region spatial distribution data $X_t$ and $\Delta X_t$. The regional seismic electromagnetic wave discriminator extracts seismic electromagnetic field signals $O_s$ from the observation stations which are mutually present in an allowable arrival time interval $\Delta T_{12}$ to output a noiseless seismic electromagnetic field signal $O_r$. The regional characteristic estimator, which is supplied with the signal $O_r$, outputs a regional characteristic signal $C_r$ including the pulse number of the signal $O_r$ for each amplitude level and a maximum value of the signal $O_r$, and seismic electromagnetic field source region central position data ($X_r$ and $\Delta X_r$) and intensity distribution $I_r$, which are calculated as average distribution data ($X_r$ and $\Delta X_r$) on the basis of the local direction distribution data ($d_{Oi}$ and $\Delta d_{Oi}$). The regional characteristic estimator further outputs the epicentral distance L from the observation point to the central position $X_r$. The source region distribution estimator calculates a weighted mean of the spatial distribution data $X_t$ and $\Delta X_t$ from the tomography builder, the average distribution data $X_r$, $\Delta X_r$ and $I_r$ from the regional characteristic estimator, and source region data $X_i$, $\Delta X_i$ and $I_i$ calculated from the arrival bearing data (d and $\Delta$d) inputted from the observation station, thereby estimating a seismic electromagnetic field source central position $X_0$, extension $\Delta X_0$ and intensity distribution $I_0$, and transmits the data $X_0$ and $\Delta X_0$ to the refined local characteristic estimator of each of the observation stations. The magnitude estimator calculates an earthquake magnitude M on the basis of the data $X_0$ and $\Delta X_0$, the characteristic signals $C_e$, $C_f$, and $C_f$, and the epicentral distance L. The earthquake occurrence time estimator estimates occurrence time $T_E$ by adding empirically set time $\Delta T$ to abnormality occurrence time $T_0$ obtained on the basis of the function of time and input pulse numbers of the characteristic signals $C_f$, $C_e$ and $C_f$.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF PREFERRED EMBODIMENTS

Embodiments of the present invention will be described below with reference to the accompanying drawings.

Figure 1:
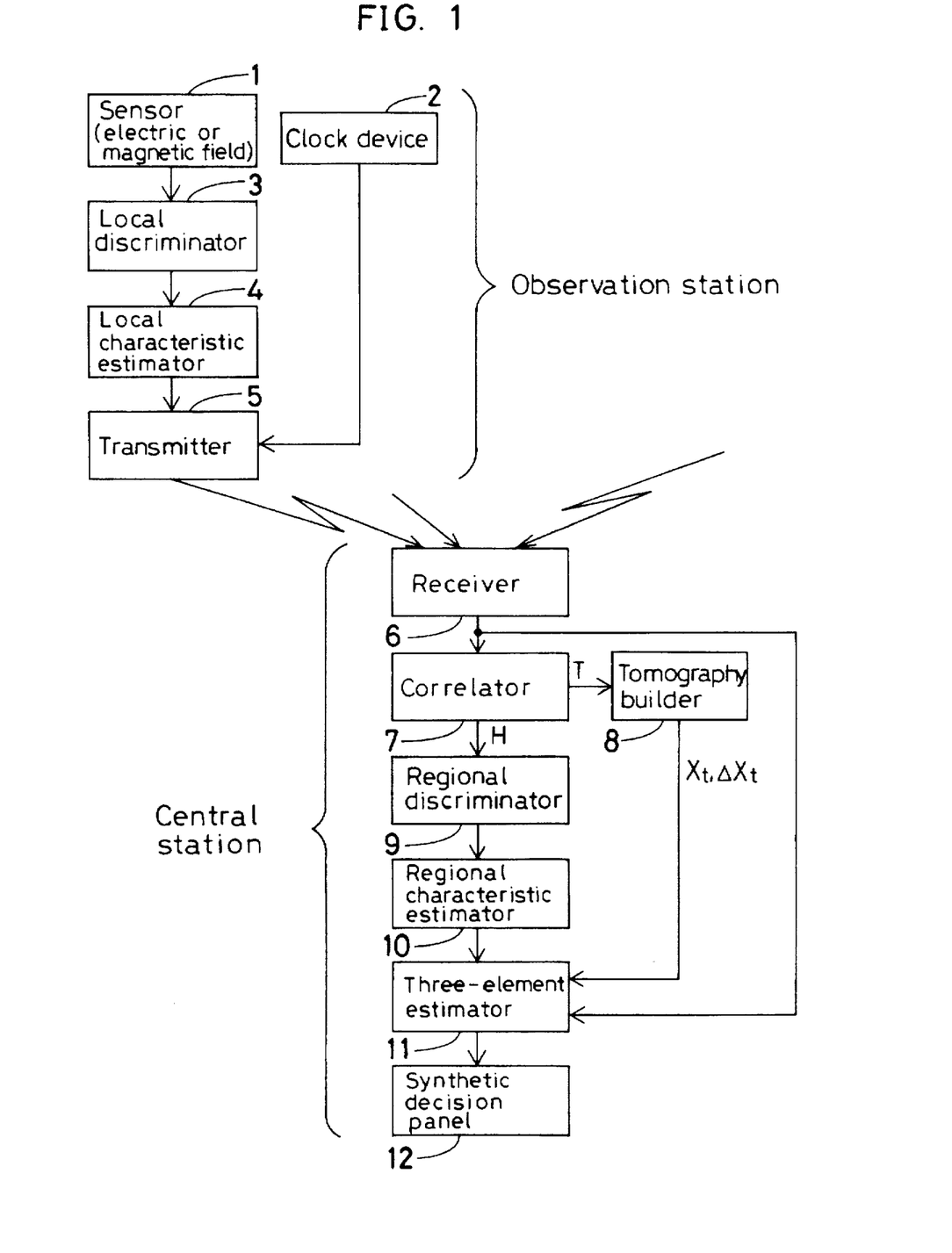
FIG. 1 is a block diagram schematically showing an embodiment of a system for carrying out a method of imminent earthquake prediction by observation of electromagnetic field according to the present invention, in which the upper block diagram schematically shows one of a plurality of observation stations, and the lower block diagram schematically shows a central station.

FIG. 1 is a block diagram schematically showing an embodiment of a system for carrying out a method of imminent earthquake prediction by observation of electromagnetic field according to the present invention. FIG. 1 contains a block diagram schematically showing one of a plurality of observation stations, and a block diagram schematically showing a central station. The observation station has a sensor 1, a clock device 2, a local discriminator 3, a local characteristic estimator 4, and a transmitter 5. The central station has a receiver 6 for receiving signals transmitted from a plurality of observation stations, a correlator 7, a tomography builder 8, a regional discriminator 9, a regional characteristic estimator 10, a three-element estimator 11, and a synthetic decision panel 12.

In the embodiment shown in FIG. 1, at least two observation stations are installed at different places. Each observation station observes electromagnetic field signals accompanying microfractures that occur in a focal region before the main fracture of the Earth's crust, and it discriminates and processes seismic electromagnetic field signals. The central station receives all data transmitted from each observation station, and processes the received data to make imminent earthquake prediction. Devices that are placed in each observation station will be explained below. The sensor 1 is either an electric field measuring sensor, e.g. a borehole antenna, a dipole antenna, etc., or a magnetic field measuring sensor, e.g. an induction-type magnetic field sensor. The clock device 2 is a device for synchronizing a plurality of observation stations with each other with an accuracy of about 1 microsecond. The local discriminator 3, as will be clear from the detailed description of FIG. 2 (described later), eliminates noise, such as lightning discharge, from seismic electromagnetic field signals detected with the sensor 1, and outputs a noise-free seismic electromagnetic field signal on the basis of characteristics of the raw seismic electromagnetic field signal, such as the waveform and spectrum thereof. Further, the local discriminator 3 outputs arrival bearing data d (direction), together with extension Δd, of a lightning electromagnetic field signal. The local characteristic estimator 4 obtains local characteristics of the input seismic electromagnetic field signal, such as the pulse number for each amplitude level, every predetermined time. The transmitter 5 transmits raw data and seismic electromagnetic field signal characteristics obtained at each observation station to the central station.

Next, devices that are placed in the central station, which receives signals transmitted from each of the above-described observation stations, will be explained. The receiver 6 receives all data transmitted from each of observation stations usually installed at two or more places. The correlator 7 calculates the cross-correlation function $R_{ij}(t)$ between time-series data of predetermined time length transmitted from a pair of different observation stations, and smooths the cross-correlation function. Then, the correlator 7 obtains a point of time at which the smoothed cross-correlation function reaches a maximum, and determines that point of time to be delay time T. The correlator 7 also obtains the half-width H of the smoothed cross-correlation function. Receiving the delay time T, the tomography builder 8A obtains spatial distribution $X_t$ of the seismic electromagnetic field signal source regions, together with extension $\Delta X_t$, from the input delay time T, as will be clear from the description of FIG. 3 (described later). Receiving the half-width H, the regional discriminator 9 extracts signals which are detected at at least three observation stations, and which are present within an allowable arrival time interval, as seismic electromagnetic field signals, by taking into consideration the delay time T obtained at the correlator 7, as will be clear from the description of FIG. 3 (described later). The regional characteristic estimator 10 receives the signals discriminated and extracted as seismic electromagnetic field signals at the regional discriminator 9 to calculate regional characteristic values of the seismic electromagnetic field signals by the same calculating method as that used in the local characteristic estimator 4.

The three-element estimator 11 estimates three fundamental elements of earthquake prediction, that is, occurrence time, place and magnitude of an earthquake, by synthetically considering the regional characteristic values obtained at the regional characteristic estimator 10, the spatial distribution of seismic electromagnetic field signal source regions, obtained at the tomography builder 8, intensity distribution data, the local characteristics transmitted through the receiver 6, etc. The synthetic decision panel 12 calculates a degree of reliability of the values of the three fundamental elements of earthquake prediction estimated at the three-element estimator 11 by referring to reference data concerning observation data of crustal activities such as microearthquakes, and also to other reference data such as meteorological data.

Figure 2:
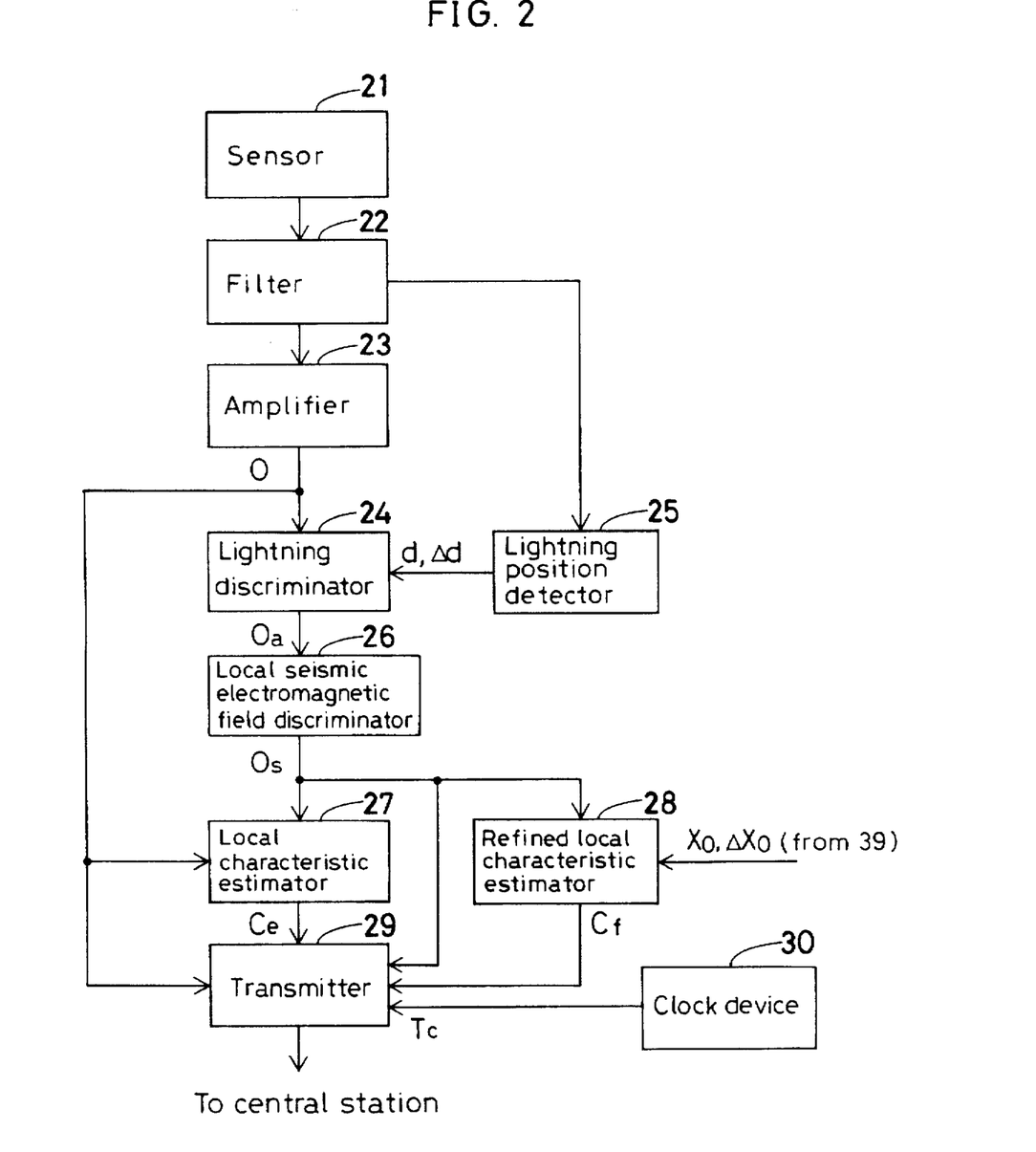
FIG. 2 is a detailed block diagram of the observation station shown in FIG. 1.
Figure 3:
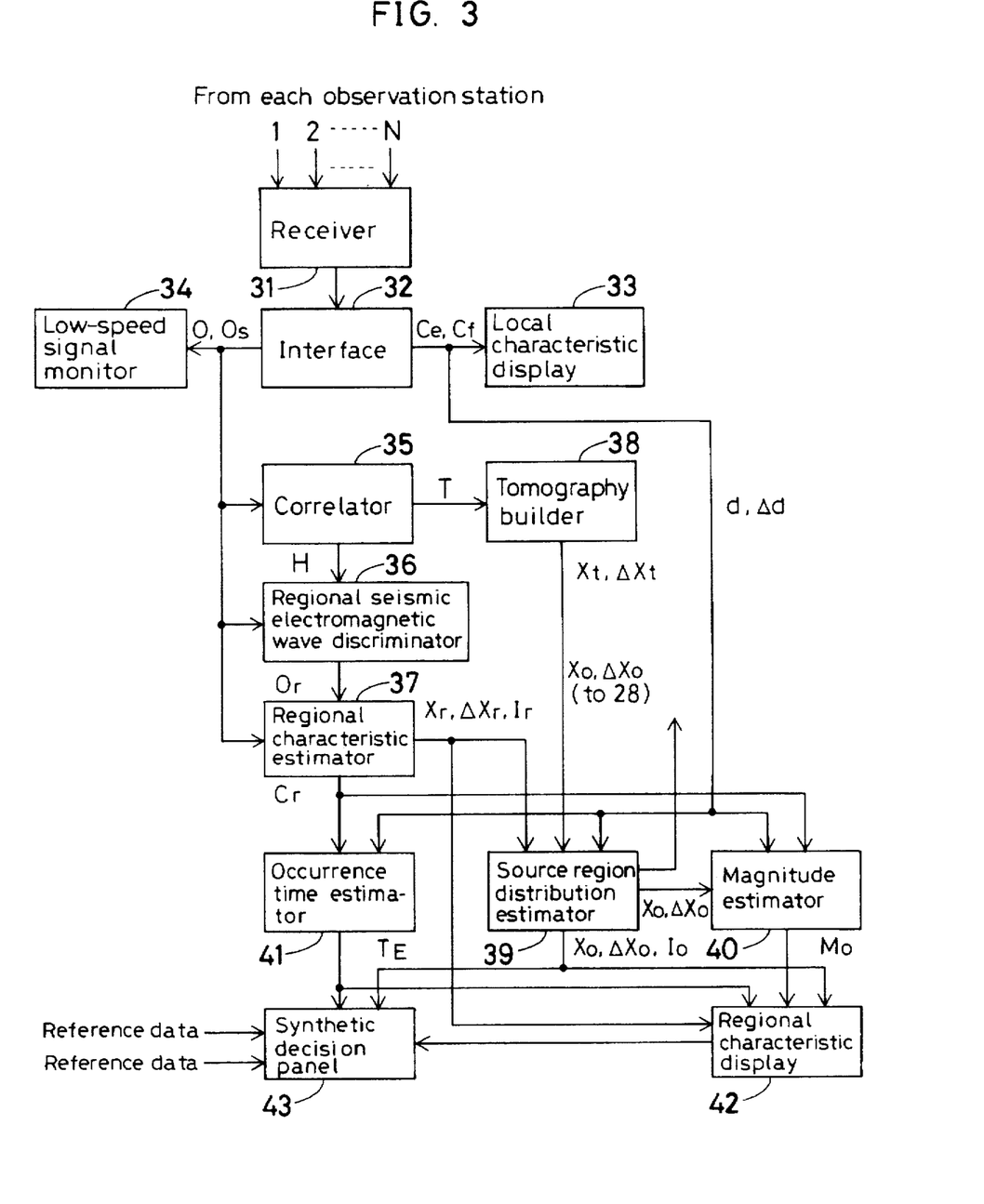
FIG. 3 is a detailed block diagram of the central station shown in FIG. 1.

FIG. 2 is a detailed block diagram of the observation station shown in FIG. 1, and FIG. 3 is a detailed block diagram of the central station shown in FIG. 1.

In the observation station shown in FIG. 2, a sensor 21 measures electric or magnetic field. Examples of devices usable as the sensor 21 are a borehole antenna for detecting vertical electromagnetic field (i.e. a monopole antenna using metal pipes of length several hundreds meters buried vertically in the ground; see Japanese Patent Application Post-Examination Publication No. 5-35999), a combination of two pairs of electrodes (or two dipoles) several tens meters separated for measuring the horizontal earth potential component, a loop antenna for measuring three components of magnetic field, and an induction magnetic field sensor.

A filter 22 eliminates civil noises as far as possible from the signal detected by the sensor 21 to obtain a noise-free frequency component not higher than 200 kHz, e.g. from 1 to 9 kHz, from 0.01 to 0.7 Hz, from 0 to 0.7 Hz, etc., and outputs the noise-eliminated signal to an amplifier 23. Receiving the signal, the amplifier 23 outputs an amplified signal O.

A lightning position detector 25 is formed by using a commercially available lightning position detection system (e.g. SAFIR, LPATS, LLPS, etc.) containing a clock device, e.g. high-precision GPS clock, for synchronizing the clock time at a plurality of observation stations with an accuracy of about 1 microsecond. The lightning position detector 25 discriminates lightning discharge, and transmits a lightning-induced signal to a lightning discriminator 24. In addition, the lightning position detector 25 determines the arrival direction of the lightning electromagnetic field by measurement at one point, and obtains electromagnetic field arrival bearing data d (direction) and dispersion Δd. The data d and Δd are obtained from the phase relationship of electric or magnetic signals detected by the sensor 21, or the arrival time of lightning signals to a plurality of antennas.

The lightning discriminator 24 receives the lightning discharge-induced signal from the lightning position detector 25, and eliminates the lightning-induced signal from the output signal O from the amplifier 23 to output a seismic electromagnetic field signal $O_a$, together with the electromagnetic field arrival bearing data d and Δd obtained by the lightning position detector 25.

A local seismic electromagnetic field discriminator 26 compares the signal $O_a$ with the waveforms of a multiplicity of known seismic electromagnetic field signals which have previously been prepared by taking into consideration different frequency bands, antennas of different characteristics, electrode output difference, etc., extracts a known seismic electromagnetic field signal having the same waveform as that of the signal $O_a$, and outputs a local seismic electromagnetic field signal $O_r$, which has got rid of noises as far as possible.

A local characteristic estimator 27 detects the pulse number for each amplitude level by pulse-height analyzing technique with regard to the electromagnetic field signal $O_s$ obtained at the local seismic electromagnetic field discriminator 26, which has got rid of signals unsuitable for long distance transmission, e.g. a high-frequency signal of 10 kHz or higher. Further, the local characteristic estimator 27 obtains maximum and minimum values of the signal $O_s$ in a predetermined time interval (e.g. 3 seconds), and outputs the obtained signals together as a local characteristic signal $C_e$. In a transmitter 29, a clock signal $T_c$ from a clock device 30 is added to the signal $C_e$, and the resulting signal is transmitted to the central station (described later) from the transmitter 29. Further, assuming that there are n items of arrival bearing data d with dispersion ±Δd, determined at the lightning position detector 25, in a predetermined time interval, the local characteristic estimator 27 successively calculates arithmetic mean values $d_{o1}=(d_1+d_2+\ldots+d_n)/n$ of $d_1, d_2, \ldots d_n$ every predetermined time, together with the extension $\Delta d_{o1}$. The local characteristic estimator 27 successively transmits local direction distribution data $d_{oi}$ and $\Delta d_{oi}$ obtained as described above to the central station through the transmitter 29. It should be noted that, when the algorithm of the local seismic electromagnetic field discriminator 26 is incomplete, similar processing is also executed with respect to the raw signal O that is outputted from the amplifier 23, whereas, when the local seismic electromagnetic field discriminator 26 functions ideally, the processing for the signal O is unnecessary.

Figure 4:
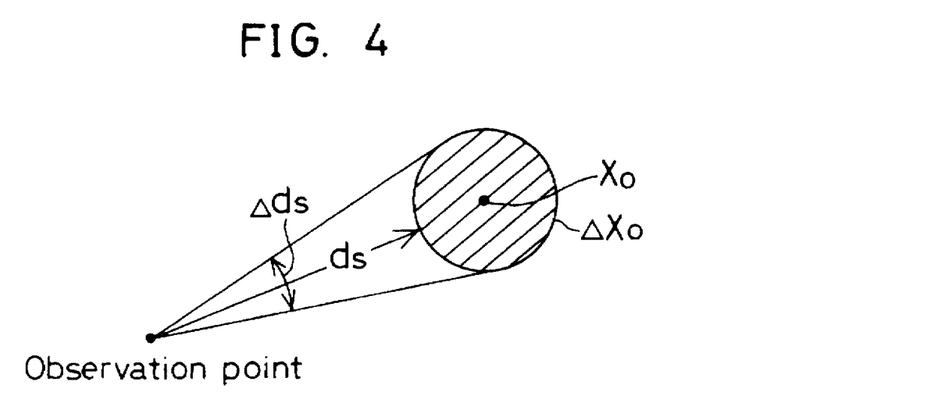
FIG. 4 schematically shows the relationship between a central direction $d_s$ connecting an observation point and a seismic electromagnetic field source central position $X_0$ and a direction dispersion $\Delta d_s$ obtained from the extension of seismic electromagnetic field.
Figure 5:
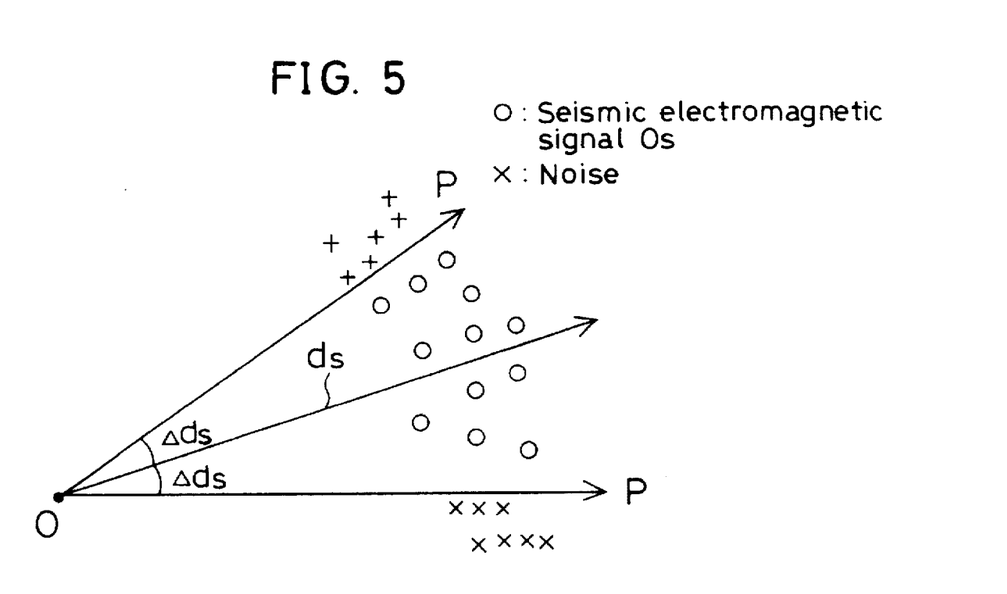
FIG. 5 schematically shows that only signal ($O_s$) pulses (indicated by the mark o) which are present in a spatial window ($d_s \pm \Delta d_s$), that is, the solid angle ∠POP shown in the figure, are to be extracted.

A refined local characteristic estimator 28 receives seismic electromagnetic field signal source central position data $X_0$, together with extension $\Delta X_0$, which is obtained by a weighting operation and transmitted from an earthquake source region distribution estimator 39 of the central station, as will be clear from the description made later. On the basis of the central position data $X_0$ and extension $\Delta X_0$, together with previously stored position data concerning the observation point of each observation station, the refined local characteristic estimator 28 calculates a central direction $d_s$ connecting the observation point and the central point $X_0$ of the source region, together with dispersion $\Delta d_s$, as shown in FIG. 4. Further, as shown in FIG. 5, the refined local characteristic estimator 28 counts the number of pulses (indicated by the mark o) of the seismic electromagnetic field signal $O_s$ for each amplitude level within a spatial window ($d_s \pm \Delta d_s$) defined by $d_s$ and $\Delta d_s$, that is, within the region defined by $\angle POP$: i.e. 2 pulses between the amplitude levels $P_3$ and $P_2$; 1 pulse between the amplitude levels $P_2$ and $P_1$; and so forth. The refined local characteristic estimator 28 further calculates maximum and minimum amplitude values in a predetermined time interval of the output signal $O_s$ from the local seismic electromagnetic field discriminator 26, and outputs the obtained signals together as a refined local characteristic signal $C_f$. Signals that are indicated by the mark X in FIG. 5 are treated as noises, and the above-described signal processing is not executed for these signals. It should be noted that the above-described signal processing is executed every predetermined time.

Among seismic electromagnetic field signals $O_s$, low-frequency signals, e.g. signals $O_s$ of 10 kHz or lower, are transmitted directly to the central station from the local seismic electromagnetic field discriminator 26 through the transmitter 29. The transmitter 29 further transmits the arrival bearing data d, $\Delta d$, the local direction distribution data $d_{0i}$, $\Delta d_{0i}$, the local characteristic signal $C_e$, and the refined local characteristic signal $C_f$, together with the observation point raw data O outputted from the amplifier 23, and the clock signal $T_c$ from the clock device 30.

At the central station shown in FIG. 3, a receiver 31 receives data from observation stations at observation points 1, 2 ... N, and an interface 32 distributes the received data. Let us assume that the data from the i-th observation point is $O_{i(j)}$, and the local characteristic data is $C_{i(j)}$. In the following description, a part or the whole of suffix attached to data may be occasionally omitted for the purposes of simplifying the description. A local characteristic display 33 displays local characteristics $C_e$ and refined local characteristics $C_f$ transmitted from the local characteristic estimator 27 and refined local characteristic estimator 28 of each observation station. A low-speed signal monitor 34 records raw data O and low-frequency signal $O_s$ transmitted from the amplifier 23 of each observation station.

Figure 6A:
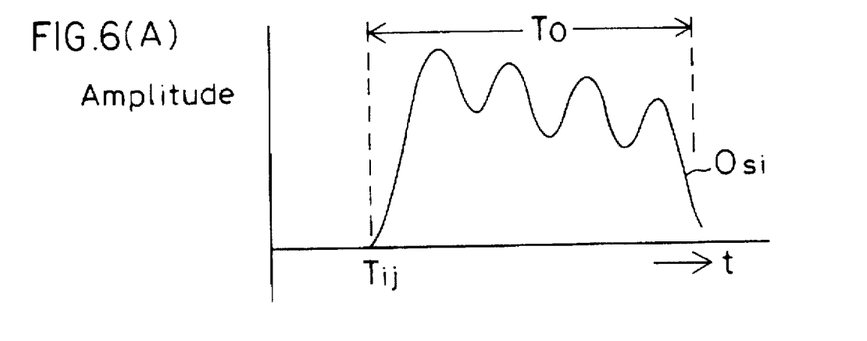
FIGS. 6A and 6B show the waveforms of seismic electromagnetic field signals, in which part (A) is a graph illustrating the waveform of a seismic electromagnetic field signal $O_{si}$ inputted from an observation point i with a delay time $T_{ij}$ with respect to an observation point j, and part (B) is a graph illustrating the waveform of a seismic electromagnetic field signal $O_{sj}$ inputted from the observation point j.
Figure 6B:
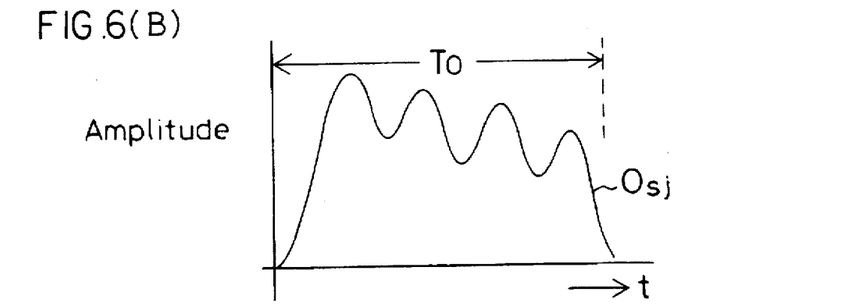

A correlator 35 receives a low-frequency signal $O_s$ inputted from each observation station. More specifically, as time-series data having a predetermined time length $T_0$, the signal $O_{si}$ from the observation point i is inputted with a delay time $T_{ij}$, as shown in part (A) of FIG. 6, and the signal $O_{sj}$ from the observation point j is inputted, as shown in part (B) of FIG. 6. The cross-correlation function $R_{ij}(t)$ between the signals $O_{si}$ and $O_{sj}$ is given by $$R_{ij}(\delta t)=\int O_{si}(t+\delta t)O_{sj}(t)dt$$

Further, the cross-correlation function $R_{ij}(t)$ is smoothed by calculating the moving average (the average of N adjacent values) to obtain $$R_{sij}(t)=\int \omega(t-\tau)R_{ij}(t)d\tau$$

Then, a value $T_{ij}$ of $\delta t$ at which $R_{sij}(\delta t)$ reaches a maximum is obtained. That is, a delay time $T_{ij}$ that satisfies the following conditions is obtained (see Japanese Patent Application Post-Examination Publication No. 5-36000):

$$dR_{ij}(\delta t)/d\delta t=0, \quad d^2R_{ij}(\delta t)/d\delta t^2<0$$

Assuming that points of time at which the smoothed cross-correlation function $R_s$ is (½) (R) are $T_1$ and $T_2$ ($T_2 > T_1$), a half-width H is given by $$H_{12}=T_2-T_1$$

The half-width H is transmitted to a regional seismic electromagnetic wave discriminator 36, while the delay time T is transmitted to a tomographybuilder 38.

Figure 7:
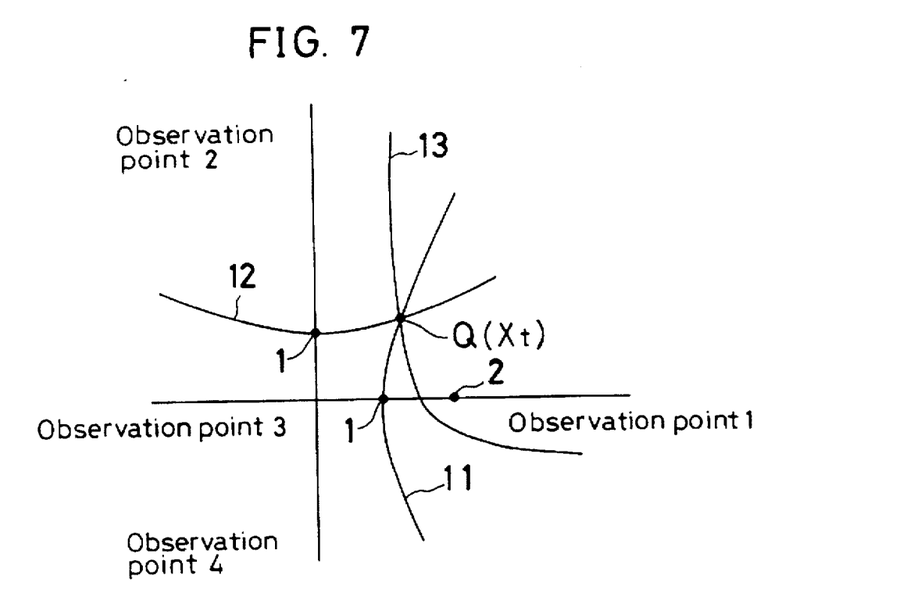
FIG. 7 schematically shows a seismic electromagnetic field occurrence point $X_s$ which is obtained as an intersection Q (seismic electromagnetic field source region) between three hyperboloids of two sheets 11, 12 and 13.

The tomography builder 38 executes the following signal processing: With regard to the delay time T obtained at the correlator 35, if there are four or more observation points, three or more independent delay times T exit. Therefore, as shown in FIG. 7, hyperboloids of two sheets 11, 12 and 13 are drawn as loci of points at which the propagation distance difference corresponding to each delay time is constant, with any pair of observation points defined as foci of a hyperboloid of two sheets. That is, the hyperboloid of two sheets 11 is drawn by a hyperbola as being a line of intersection between a hyperboloid with the observation points 1 and 3 as foci and a plane containing the observation points 1, 2, 3 and 4; the hyperboloid of two sheets 12 is similarly drawn by a hyperbola with the observation points 2 and 4 as foci; and the hyperboloid of two sheets 13 is drawn by a hyperbola with the observation points 1 and 4 as foci. The hyperboloids 11, 12 and 13 may be expressed by rectangular coordinate representation as follows:

$$X^2-(Y^2/3)=1$$

$$(-X^2/3)+Y_{2-b\ 1}$$

$$2XY+2X-2Y=3$$

The intersection Q of the hyperboloids 11, 12 and 13 is determined to be an earthquake occurrence spatial point (see Japanese Patent Application Post-Examination Publication No. 5-36000). Next, a central position $X_r$ of the spatial distribution of the set of earthquake occurrence spatial points, together with extension $\Delta X_r$ is calculated.

Figure 8A:
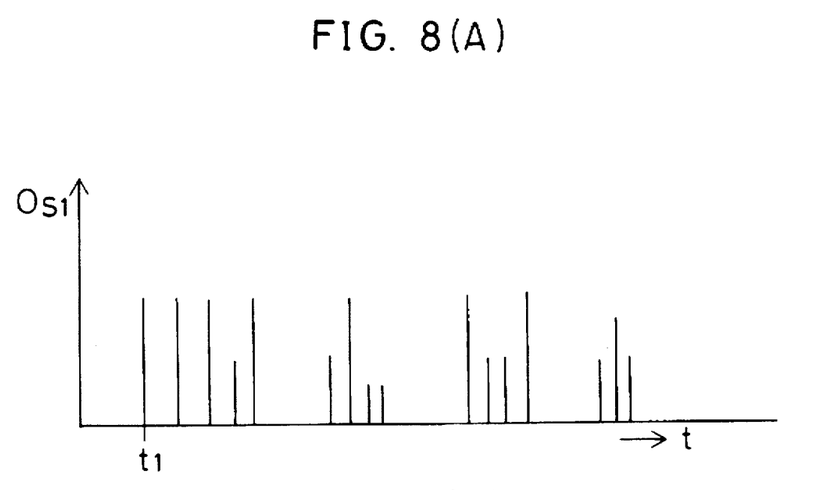
FIGS. 8A and 8B schematically show the relationship between signals inputted from different observation points: in which part (A) is a graph illustrating a signal $O_{s1}$ inputted from an observation point 1 at arrival time $t_1$; part (B) is a graph illustrating a signal $O_{s2}$ inputted from an observation point 2 at arrival time $t_2$, and delay time $T_{12}$ of the signal $O_{s2}$ with respect to the signal $O_{s1}$; and part (C) is a graph in which the arrival time $t_2$ is shifted so as to coincide with the arrival time $t_1$, and two signals $O_{s1}$ and $O_{s2}$ which are mutually present in an allowable arrival time interval $T_{12}$ are indicated by the mark o, while the other signals are regarded as being noise (indicated by the mark X).
Figure 8B:
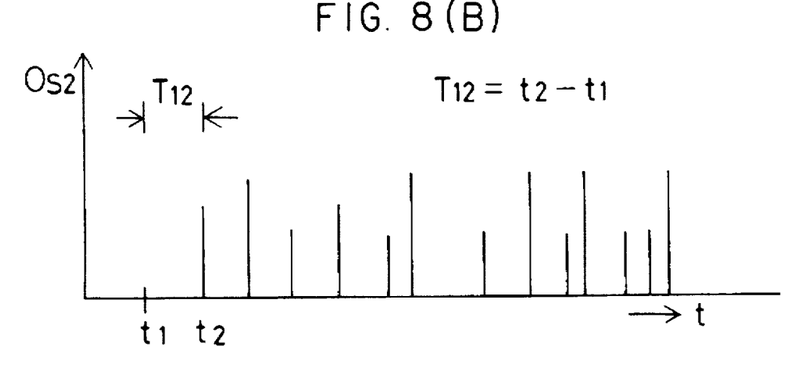
Figure 8C:
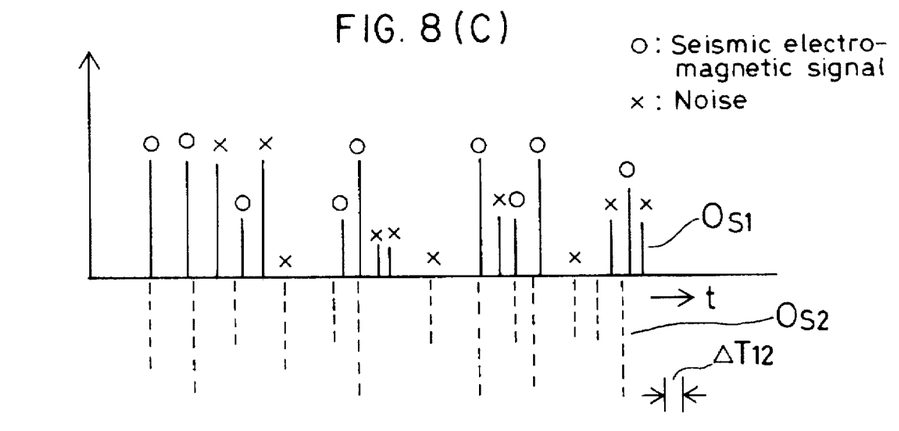

The regional seismic electromagnetic wave discriminator 36, which is supplied with the low-frequency signal $O_s$, together with the half-width H from the correlator executes the following signal processing in order to further eliminate noise from the signal $O_s$ inputted from each observation station with a delay time. That is, among all observation points, three observation points which are arbitrarily determined are numbered, for example, from 1 to 3, and the three observation stations are divided into three groups of two: (1, 2), (2, 3), and (3, 1). With respect to time-series data $O_{s1}$ and $O_{s2}$ of the signals $O_s$ from the group (1, 2) arriving at times $t_1$ and $t_2$ as shown in FIGS. 8A and 8B, the time-series data $Os_2$ is shifted by a delay time $T_{12}$ ($T_{12}=t_2-t_1$) so that the time $t_2$ is made coincident with the time $t_1$, as shown in FIG. 8C, and the time-series data $O_{s1}$ (shown by the solid lines) and $O_{s2}$ (shown by the dotted lines) are compared with each other, thereby extracting only seismic electromagnetic field signals (indicated by the mark o) which are mutually present within a time window of allowable arrival time interval $\Delta T_{12}$ determined by the half-width $H_{12}$, which is outputted from the correlator 35. By this signal processing, noises (indicated by the mark X) which are present outside the window are eliminated. The above-described operation is also carried out with respect to the two groups (2, 3) and (3, 1). The signal that is present within the window is outputted as a regional seismic electromagnetic wave discriminating signal $O_r$. It should be noted that it is also possible to extract all the three time-series data signals $O_s$ from the observation stations 1, 2 and 3 that are mutually present within a predetermined time interval, which is set by taking delay time into consideration. Such processing may be executed with respect to any arbitrarily set group of observation stations.

A regional characteristic estimator 37, which is supplied with the signal $O_r$, detects the seismic electromagnetic field signal pulse number for each amplitude level of the signal $O_r$ by pulse-height analyzing technique in the same way as in the case of the local characteristic estimator 27. Further, the regional characteristic estimator 37 obtains maximum and minimum values of the seismic electromagnetic field signal in a predetermined time interval, and outputs the obtained signals together as a regional characteristic signal $C_r$.

Figure 9A:
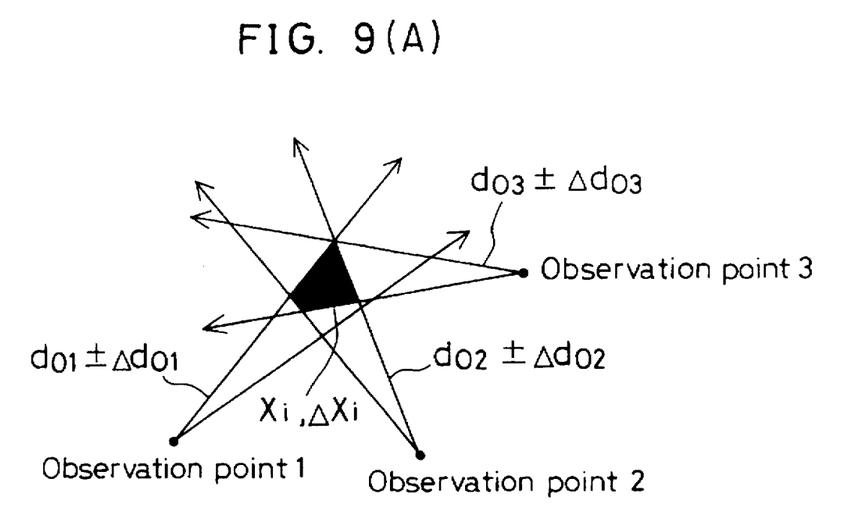
FIGS. 9A and 9B schematically show the relationship between electromagnetic signal source regions and a plurality of observation points: in which part (A) shows the relationship between a plurality of observation points and an electromagnetic field pulse generation source $X_i$, together with dispersion $\Delta X_i$, defined by an intersection between local direction distribution data ($d_{0i} \pm \Delta d_{0i}$) obtained at the observation points; part (B) shows each electromagnetic field pulse generation source $X_i$, together with dispersion $\Delta X_i$, by a circle, and also shows the set of a large number of circles as a cloud-shaped mass; and part (C) shows the positional relationship between an average central position $X_r$, together with extension $\Delta X_r$, of the could-shaped mass shown in part (B) and an observation point, and also shows the positional relationship of an epicentral distance L from the observation point to the central position $X_r$.
Figure 9B:
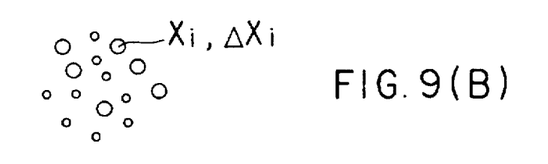
Figure 9C:
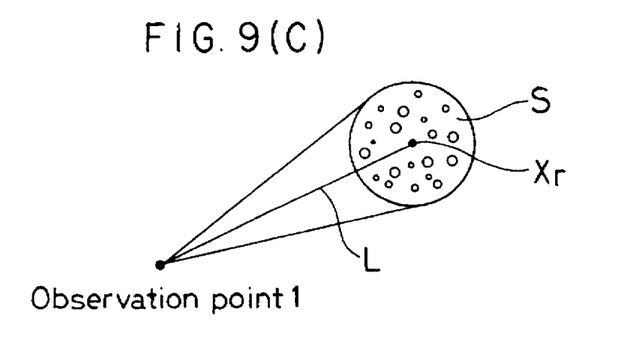

Further, the regional characteristic estimator 37 calculates an average central point $X_r$, together with extension $\Delta X_r$, and average intensity distribution $I_r$ of the seismic electromagnetic field signal source regions from local direction distribution data $d_{oi}$ and $\Delta d_{oi}$ transmitted from each observation station as follows: As shown in FIG. 9A, an intersection region is calculated, for example, from position data of given observation stations 1, 2 and 3 and local direction distribution data $d_{o1}+\Delta d_{o1}$, $d_{o2}\pm\Delta d_{o2}$ and $d_{o3}\pm\Delta d_{o3}$. Further, a center $X_i$ of the intersection region, together with dispersion $\Delta X_i$, is calculated. These calculating operations are carried out for all the input seismic electromagnetic field signals. If each seismic electromagnetic field signal source $X_i$, together with dispersion $\Delta X_i$, calculated in this way, is depicted as a circle, as schematically shown in FIG. 9B, the set of a large number of large and small circular points can be depicted as a cloud-shaped mass. Then, as shown in FIG. 9C, an average central position $X_r$, together with extension $\Delta X_r$, of the region depicted as a cloud-like mass, is calculated. Further, an average intensity distribution $I_r$ is calculated from the ratio M/S of the number M of large and small circular points present in the cloud-shaped mass to the area S thereof. The regional characteristic estimator 37 outputs the obtained signals as regional characteristic signals $C_r$. It should be noted that, as shown in part (C) of FIG. 9, the distance L from the observation point 1, for example, to the average central position $X_r$ of the seismic electromagnetic field is calculated during the above-described process. The average central position $X_r$, extension $\Delta X_r$ and intensity distribution $I_r$, obtained as described above, are sent to the source region distribution estimator 39 and also to a regional characteristic display 42.

The source region distribution estimator 39 estimates a seismic electromagnetic field signal source central position $X_O$, extension $\Delta X_O$ and intensity distribution $I_O$ on the basis of the spatial distribution data $X_r$, $\Delta X_r$ related to the seismic electromagnetic field source regions, which are sent from the tomography builder 38, the seismic electromagnetic field source region central position $X_r$ as average distribution data of electromagnetic field signals, together with the extension $\Delta X_r$ and intensity distribution $I_r$, which are sent from the regional characteristic estimator 37, and seismic electromagnetic field source region data $X_i$, extension $\Delta X_i$ and intensity distribution $I_i$ calculated on the basis of arrival bearing data d and $\Delta$d from each observation station, which are sent from the interface 32, as follows: With respect to three groups of seismic electromagnetic field signal data: $X_t$ and $\Delta X_t$; $X_i$, $\Delta X_i$ and $I_i$; and $X_r$, $\Delta X_r$ and $I_r$; a central position $X_O$, together with extension $\Delta X_O$, is calculated by an appropriate weighting operation as shown below:

$$X_O=(1/3)(w_1X_t+w_2X_r+w_3X_i)$$

$$\Delta X_O=(1/3)(w_1\Delta X_t+w_2\Delta X_r+w_3\Delta X_i)$$

where $w_1+w_2+w_3=1$.

Further, a weighted intensity distribution $I_O$ is also calculated by $$I_O=(1/2)(w_4I_i+w_5I_r)$$

In this way, central position data $X_O$, $\Delta X_O$ and intensity distribution $I_O$ are successively sent out. As has been described above, the data $X_O$ and $\Delta X_O$ obtained at the source region distribution estimator 39 are transmitted to the refined local characteristic estimator 28 of each observation station where refined local characteristics $C_f$ are calculated for only signals within the spatial window at the relevant observation point. The refined local characteristics $C_f$ are transmitted to the central station and displayed at the local characteristic display 33. It should be noted that in the weighted mean calculating algorithm, a considerable weight is assigned to the source region data $X_t$ and $\Delta X_t$ obtained at the tomography builder 38.

An earthquake occurrence time estimator 41 calculates a weighted mean characteristic value $C_m$ of the function of time and the number of pulses of the input characteristic signals $C_e$, $C_f$ and $C_r$ per predetermined time interval by $$C_m=(1/3)(w_eC_e+w_fC_f+w_rC_r)$$

Figure 10A:
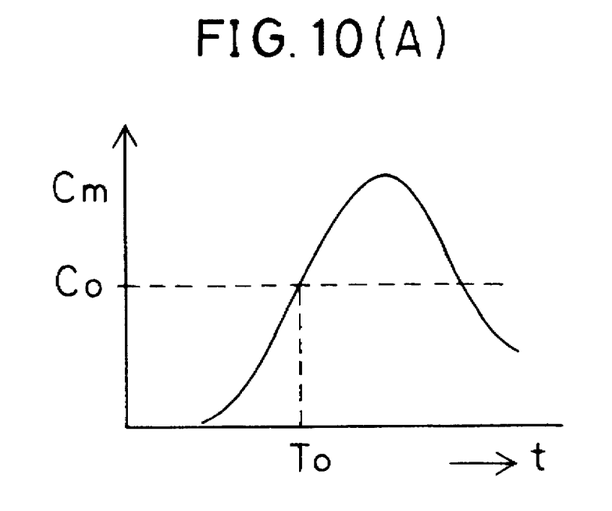
FIGS. 10A and 10B schematically show the seismic electromagnetic field pulse number time function $C_m$, in which part (A) is a graph schematically showing the relationship between the pulse number time function $C_m$, an abnormality judgment criterion $C_0$ to judge the imminence of the earthquake, and time $T_0$ at which $C_m$ exceeds $C_0$, and part (B) is a graph schematically showing the relationship of earthquake occurrence time $T_E = T_0 + \Delta T$.
Figure 10B:
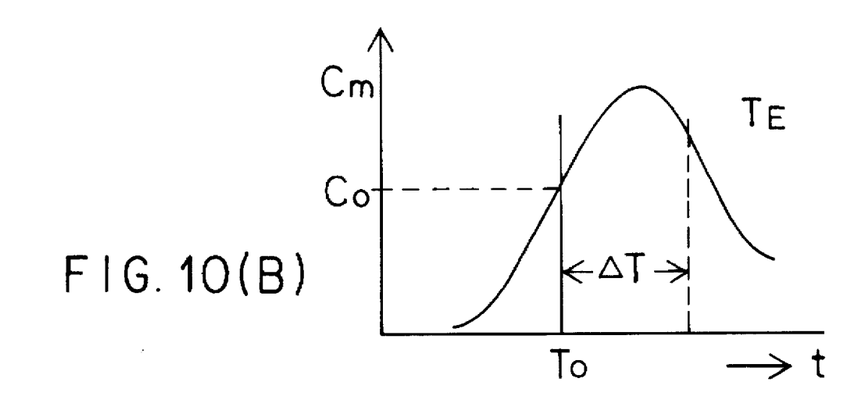

At the beginning, the values of the weights are, for example, set as follows: $w_e=0.2$; $w_f=0.3$; and $w_r=0.5$. However, optimal weight values may be empirically determined. If $C_m$ thus calculated every predetermined time, e.g. 30 minutes, is plotted along the ordinate axis, and time t is plotted along the abscissa axis, a graph that is exemplarily shown in part (A) of FIG. 10 may be depicted. In the graph, time $T_O$ at which the weighted mean value $C_m$ of the pulse number time function exceeds an abnormality judgment criterion $C_O$ used to judge the imminence of the earthquake, which is empirically known, is obtained. Then, as shown in part (B) of FIG. 10, time $\Delta T$ (usually, about several hours) which is empirically known to go before the occurrence of the earthquake is added to the time $T_O$, i.e.

$$T_E=T_O+\Delta T$$

thereby estimating earthquake occurrence time $T_E$.

The system may have a learning function whereby the criterion $C_O$ for earthquake occurrence judgment and the time $\Delta T$ between the time $T_O$ and the occurrence of the earthquake are empirically determined, and they are refined on the basis of the accumulation of data in various regions. According to the present-day studies, $\Delta T$ is known to be approximately from several hours to several days, although it depends on the manner of determining the criterion $C_0$.

Figure 11:
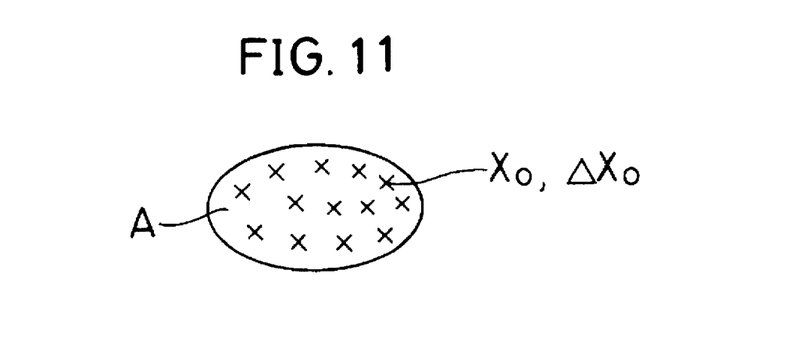
FIG. 11 schematically shows the area A of a region in which the set of seismic electromagnetic field source regions indicated by the mark X is depicted as a cloud-shaped distribution.

A magnitude estimator 40, as shown in FIG. 11, calculates a source region extension parameter, e.g. area A, on the basis of the source regions (indicated by the mark X) of the seismic electromagnetic field signal data $X_0$ and $\Delta X_0$, obtained at the source region distribution estimator 39, as follows: As shown in FIG. 11, since the seismic electromagnetic field signal source regions form a cloud-shaped distribution, as has been described above, the area of the region containing the cloud-like mass is calculated. Approximating the region by a circle or an ellipse makes it easier to calculate the area A. The area A is inserted into the following empirical formula for calculating the earthquake magnitude, which is known in seismology, $$M = a \text{Log} A + b \text{ (where a and b are constants)}$$

thereby obtaining an estimate $M_1$ of earthquake magnitude M.

Next, a second estimate $M_2$ of earthquake magnitude is obtained by inserting the pulse numbers, maximum values and minimum values of the regional characteristic signal $C_r$ from the regional characteristic estimator 37 and the local characteristic signal $C_e$ and refined local characteristic signal $C_f$ from each observation station, and the epicentral distance L from the observation point to the source region central point $X_r$, obtained at the regional characteristic estimator 37, into the following empirical relation for the earthquake magnitude:

$$\text{Empirical relation} = M_2 = f(C_r, C_e, C_f, L)$$

The final estimate $M_0$ of the earthquake magnitude M is determined by calculating the weighted mean of the estimates $M_1$ and $M_2$ as follows:

$$M_0 = (\frac{1}{2})(w_1 M_1 + w_2 M_2)$$

It should be noted that, although no specific form of obtaining the above $M_2$ has yet been known, calculation should be performed with $w_2$ set at 0, i.e. $w_2=0$, while $M_2$ is unknown. Regarding the relationship between the extension of the seismic electromagnetic field signal source and the magnitude $M_1$, the empirical formula should also be refined on the basis of the accumulation of data for each region and each type of earthquake, e.g. earthquake mechanism. The system may have a self-learning function which enables the accuracy of the empirical formulae to be improved on the basis of the accumulation of observation data at various places in future. Accordingly, this system will become even more efficient if the users' experiences are efficiently linked to each other in the global level through a network or the like.

The regional characteristic display 42 displays all the estimates calculated at the earthquake occurrence time estimator 41, the source region distribution estimator 39 and the magnitude estimator 40, particularly the predicted values of the three fundamental elements of earthquake prediction, i.e. the earthquake occurrence time $T_E$, the earthquake occurrence central position $X_0$, together with extension $\Delta X_0$ and intensity distribution $I_0$, and the earthquake magnitude $M_0$. A synthetic decision panel 43 compares the above-described three data items of earthquake prediction with meteorological data as reference data to check whether or not there is lightning discharge, and further compares all or part of the estimated three fundamental elements of earthquake prediction with reference data concerning crustal activities such as the change of micro-seismic activities and crustal deformation data, thereby making synthetic evaluation, and thus evaluating the estimation accuracy. In such evaluation, if there is an abnormality in an observation item which is considered independent, such as crustal deformation, the degree of prediction reliability is increased. To achieve a higher level of judgment and quantitative judgment, a self-learning function may be adopted. In the early stages, however, qualitative judgment is made.

As has been described above, according to the present invention, civil noise and atmospheric discharge noise are eliminated from a seismic electromagnetic field signal detected at each of observation stations installed at at least two places, thereby obtaining a seismic electromagnetic field signal $O_a$. The signal $O_a$ is compared with the waveforms of known seismic electromagnetic field signals to extract a seismic electromagnetic field signal $O_s$ having the same waveform as that of the signal $O_a$. Then, a local characteristic signal $C_e$ is formed from the pulse number for each amplitude level of the signal $O_s$ and other data. The signal $C_e$, arrival bearing data (d and $\Delta$d), and local direction distribution data ($d_{0i}$ and $\Delta d_{0i}$) obtained from the arithmetic mean of the arrival bearing data (d and $\Delta$d) are transmitted to the central station. Meanwhile, at each observation station, a refined local characteristic signal $C_f$ is formed from the number of pulses present for each amplitude level within a spatial window which is formed by connecting the observation point and a seismic electromagnetic field source region central position ($X_0$ and extension $\Delta X_0$) indicated by data sent from the central station, and extreme values. The refined local characteristic signal $C_f$ and low-frequency signal $O_s$ are transmitted to the central station. At the central station, the correlator obtains delay time T and a half-width H from the smoothed cross-correlation function between the seismic electromagnetic field signals $O_s$ from each pair of observation points. The correlator outputs the delay time T to the tomography builder to obtain seismic electromagnetic field spatial distribution data ($X_t$ and $\Delta X_t$). The regional seismic electromagnetic wave discriminator extracts signals $O_s$ from each observation station which are mutually present within an allowable arrival time interval $\Delta T_{12}$ determined on the basis of the half-width H, and outputs the extracted signal $O_s$ as a regional characteristic signal $O_r$. The regional characteristic estimator outputs a signal $C_r$ which is formed from the pulse number for each amplitude level of the signal $O_r$ in a predetermined time period and other data, and further outputs average distribution data ($X_r$, $\Delta X_r$ and $I_r$) of seismic electromagnetic field source regions obtained on the basis of the local direction distribution data ($d_{0i}$ and $\Delta d_{0i}$). In addition, the regional characteristic estimator calculates and outputs the epicentral distance L from the observation point to $X_r$. The source region distribution estimator calculates weighted mean data ($X_0$, $\Delta X_0$ and $I_0$) of the average distribution data ($X_r$, $\Delta X_r$ and $I_r$), the spatial distribution data ($X_t$ and $\Delta X_t$) and data ($X_i$, $\Delta X_i$ and $I_i$) calculated from the arrival bearing data (d and $\Delta$d), thereby estimating a source region distribution. The magnitude estimator estimates an earthquake magnitude $M_0$ on the basis of the central position data $X_0$ with extension $\Delta X_0$, calculated as weighted mean, the local characteristic signals $C_e$ and $C_f$, the regional characteristic signal $C_r$, and the distance L. The earthquake occurrence time estimator obtains earthquake occurrence time $T_E$ by adding time $\Delta T$, which has empirically been obtained, to the abnormality occurrence time $T_0$, which is shown by the weighted mean obtained on the basis of the function of time and the pulse numbers of the regional characteristic value $C_r$, the local characteristic value $C_e$ and the refined local characteristic value $C_f$. Accordingly, noise-free seismic electromagnetic field signals can be formed at each observation station and at the central station, and moreover, it is possible to form three different kinds of signal indicative of seismic electromagnetic field characteristics, that is, the local characteristic signal $C_e$, the refined local characteristic signal $C_f$, and the regional characteristic signal $C_r$, on the basis of the seismic electromagnetic field signals. Therefore, it is possible to estimate the earthquake occurrence time $T_E$, the source region central position data ($X_0$, $\Delta X_0$ and $I_0$), and the earthquake magnitude $M_0$ with high accuracy on the basis of the above-described signals. Thus, earthquake prediction can be made with high accuracy.

Further, it is possible to check whether or not there is lightning discharge by comparing the output signals from the earthquake occurrence time estimator, the source region distribution estimator and the magnitude estimator with meteorological data. By comparing the output signals with crustal activity monitoring data, it is possible to evaluate the reliability of the estimated signals for the three fundamental elements of earthquake prediction.

Further, the imminent earthquake prediction technique of the present invention is practical and highly deterministic, and hence widely applicable. Accordingly, it becomes possible to secure people's lives by carrying out evacuation, and also possible to minimize primary and secondary disasters. Thus, disasters caused by earthquakes can be generally reduced by the imminent earthquake prediction method of the present invention.

The above description is included to illustrate the preferred embodiments and the operations thereof, and is not intended to limit the scope of the invention. The scope of the invention is to be limited only by the following claims. From the above discussions, many variations are apparent to one skilled in the art which would yet be encompassed by the spirit and scope of the invention.

What we claim is:

1. An earthquake prediction method in which seismic electromagnetic field signals detected and processed at a plurality of observation stations are transmitted to and processed by a central station to estimate earthquake occurrence time, an earthquake occurrence place, and an earthquake magnitude, thereby making earthquake prediction, said method comprising the steps of:

outputting a seismic electromagnetic field signal $O_a$ obtained by eliminating civil noise and atmospheric discharge noise from a seismic electromagnetic field signal detected with an electromagnetic field sensor of each of observation stations installed in a plurality of places, and arrival bearing data (direction d and extension $\Delta d$) concerning a lightning electromagnetic field signal detected by lightning position detecting means;

comparing said seismic electromagnetic field signal $O_a$ with waveforms of known seismic electromagnetic field signals and eliminating signals other than a signal having the same waveform as that of said seismic electromagnetic field signal $O_a$, thereby extracting a noiseless seismic electromagnetic field signal $O_s$;

outputting a local characteristic signal $C_e$ including a number of pulses present in a predetermined time interval for each amplitude level of said seismic electromagnetic field signal $O_s$, and a maximum value and a minimum value of said signal $O_s$, and local direction distribution data (main direction $d_{oi}$ and dispersion $\Delta d_{oi}$) obtained from arithmetic mean of said arrival bearing data (d and $\Delta d$) captured in a predetermined period of time;

outputting a refined local characteristic signal $C_f$ including a number of pulses for each amplitude level of said seismic electromagnetic field signal $O_s$ which are present in a spatial window defined by a central direction $d_s$ connecting an observation point of said observation station and a seismic electromagnetic field source region central position $X_0$ indicated by data sent from said central station, and a dispersion $\Delta d_s$ corresponding to an extension $\Delta X_0$ of said seismic electromagnetic field source region central position $X_0$, said refined local characteristic signal $C_f$ further including a maximum value and a minimum value of said seismic electromagnetic field signal $O_s$, but not including a noise component present outside said spatial window;

transmitting said seismic electromagnetic field signal $O_s$ having a frequency below a predetermined level, said local characteristic signal $C_e$, said refined local characteristic signal $C_f$, said arrival bearing data (d and $\Delta d$), and said local direction distribution data ($d_{oi}$ and $\Delta d_{o1}$), which are obtained at each of said observation stations, to said central station;

obtaining, at said central station, a cross-correlation function $R_{ij}(\delta t) = \int O_{si}(t+\delta t) O_{sj}(t) dt$ between said signals $O_s$ inputted from said observation stations with a delay time, smoothing said cross-correlation function $R_{ij}(\delta t)$ by a moving average to obtain a smoothed cross-correlation function $R_{sij}(t) = \int \omega(t-\tau) R_{sij}(t) d\tau$, obtaining a point of time at which said smoothed cross-correlation function reaches a maximum as delay time $T_{ij}$, and further obtaining a half-width H of said smoothed cross-correlation function;

calculating, as an earthquake occurrence spatial point, an intersection of a plurality of hyperboloids of two sheets drawn as loci of points at which a propagation distance difference corresponding to said delay time $T_{ij}$ is constant, with any pair of observation points defined as foci, and calculating a central position $X_t$ of a spacial distribution of a set of said earthquake occurrence spatial point, together with an extension $\Delta X_t$;

temporally matching time-series data of said seismic electromagnetic field signals $O_s$ inputted with a delay time so that said delay time is eliminated, extracting from said signals $O_s$ signals which are mutually present in an allowable arrival time interval $\Delta T_{12}$ determined on the basis of said half-width H of said cross-correlation function, and outputting a noiseless seismic electromagnetic field signal $O_r$;

outputting a regional characteristic signal $C_r$ including a pulse number of said signal $O_r$ for each amplitude level and a maximum value and a minimum value of said signal $O_r$, and a seismic electromagnetic field source region average central position $X_r$, extension $\Delta X_r$, and average intensity distribution $I_r$, which are obtained from an intersection region of said local direction distribution data ($d_{oi}$ and $\Delta d_{oi}$), as average distribution data, and further outputting an epicentral distance L from said observation point to said average central position $X_r$;

calculating a weighted mean of said spatial distribution central position $X_t$ and $\Delta X_t$, said average central position $X_r$, $\Delta X_r$ and $I_r$, and a seismic electromagnetic field source region $X_i$, $\Delta X_i$ and $I_i$ calculated on the basis of said arrival bearing data (d and $\Delta$d) from each of said observation stations, thereby estimating a seismic electromagnetic field source region central position $X_0$, extension $\Delta X_0$ and intensity distribution $I_0$, and transmitting said central position data $X_0$ and extension $\Delta X_0$ to each of said observations stations;

estimating an earthquake magnitude $M_0$ on the basis of said regional characteristic signal $C_r$, local characteristic signal $C_e$, refined local characteristic signal $C_f$ and epicentral distance L, together with a quantity indicating an extension of seismic eleetromagnetic field source regions, which is obtained on the basis of a set of said data central position $X_0$ and extension $\Delta X_0$; obtaining abnormality occurrence time $T_0$ based on a function of time and pulse numbers of said regional characteristic signal $C_r$; and adding empirically set time $\Delta T$ to said abnormality occurrence time $T_0$ obtained on the basis of said function of said time and pulse numbers of said regional characteristic signal $C_r$, local characteristic signal $C_e$ and refined local characteristic signal $C_f$ thereby estimating earthquake occurrence time $T_E$.

2. An imminent earthquake prediction method according to claim 1, wherein said estimated earthquake occurrence time $T_E$, said central position data $X_0$, extension $\Delta X_0$ and intensity distribution $I_0$, and said earthquake magnitude $M_0$ are compared with meteorological data to check whether or not there is lightning, and also compared with crustal activity monitoring data to evaluate reliability of said earthquake occurrence time $T_E$, said central position $X_0$, extension $\Delta X_0$ and intensity distribution $I_0$, and said earthquake magnitude $M_0$.

3. An imminent earthquake prediction method according to claim 1, wherein a value A of area is calculated on the basis of the set of said central position $X_0$ and extension $\Delta X_0$ as a quantity indicating an extension of said seismic electromagnetic field source regions, and a first estimate $M_1$ of said earthquake magnitude is obtained on the basis of said value A, and wherein a second estimate $M_2$ of said earthquake magnitude is obtained on the basis of said regional characteristic signal $C_r$, local characteristic signal $C_e$ and refined local characteristic signal $C_f$ together with said epicentral distance L, and said earthquake magnitude $M_0$ is finally obtained by calculating a weighted mean of said estimates $M_1$ and $M_2$.

4. An earthquake prediction method according to claim 3, wherein said first estimate $M_1$ of said earthquake magnitude is obtained by inserting said value A of area into the following formula:

M=aLogA+b (where a and b are constants) and said second estimate $M_2$ is obtained by inserting said regional characteristic signal $C_r$, local characteristic signal $C_e$, refined local characteristic signal $C_f$ and epicentral distance L into the following empirical relation for earthquake magnitude:

$M = f(C_r, C_e, C_f, L)$.

5. An earthquake prediction method according to claim 1, wherein said earthquake occurrence time $T_E$ is obtained by calculating a weighted mean characteristic value of a number of pulses of said characteristic signals $C_e$, $C_f$ and $C_r$ inputted per predetermined time interval to determine a weighted mean characteristic function $C_m$; obtaining an abnormality judgment criterion $C_0$ empirically set from a graph showing a relationship between said characteristic function $C_m$ and time; obtaining said time $T_0$ at which said weighted mean characteristic function $C_m$ exceeds said abnormality judgement criterion $C_0$ as time to judge that an abnormality has occurred; and adding said time $\Delta T$, which is empirically known to go before occurrence of an earthquake, to said time $T_0$.

6. An earthquake prediction system in which seismic electromagnetic field signals detected at observation stations installed at a plurality of places are processed and transmitted to a central station, and said signals are further processed at said central station to estimate earthquake occurrence time, an earthquake occurrence place, and an earthquake magnitude, thereby making earthquake prediction, wherein each of observation stations installed in a plurality of places comprises:

local seismic electromagnetic field discriminating means for comparing a seismic electromagnetic field signal $O_a$, which is obtained by eliminating civil noise and atmospheric discharge noise from a seismic electromagnetic field signal detected with an electromagnetic field sensor of said observation station, with waveforms of known seismic electromagnetic field signals which have previously been stored in memory, and for extracting a known seismic electromagnetic field signal having the same waveform as that of said seismic electromagnetic field signal $O_a$, and outputting a noiseless local seismic electromagnetic field signal $O_r$, said means further outputting arrival bearing data (d and $\Delta$d) concerning a lightning electromagnetic field signal detected by lightning position detecting means;

local characteristic estimating means for outputting a local characteristic signal $C_e$ including a number of pulses present in a predetermined time interval for each amplitude level of said seismic electromagnetic field signal $O_r$, and a maximum value and a minimum value of said signal $O_r$, and local direction distribution data ($d_{0i}$ and $\Delta d_{0i}$) obtained from arithmetic mean of said arrival bearing data (d and $\Delta$d) captured in a predetermined period of time;

refined local characteristic estimating means for outputting a refined local characteristic signal $C_f$ including a number of pulses for each amplitude level of said seismic electromagnetic field signal $O_s$ which are present in a spatial window defined by a central direction $d_s$ connecting an observation point of said observation station and a seismic electromagnetic field source region central position $X_0$ indicated by data sent from said central station, and a dispersion $\Delta d_s$ corresponding to an extension $\Delta X_0$ of said seismic electromagnetic field source region central position $X_0$, and said refined local characteristic signal $C_f$ further including a maximum value and a minimum value of said seismic electromagnetic field signal $O_s$ but not including a noise component present outside said spatial window; and means for transmitting a signal $O_s$ having a frequency below a predetermined level among signals $O_r$ outputted from said local seismic electromagnetic field discriminating means, said local characteristic signal $C_e$, said refined local characteristic signal $C_f$, said arrival bearing data (d and $\Delta$d), and said local direction distribution data ($d_{0i}$ and $\Delta d_{0i}$) to said central station;

and wherein said central station comprises:

correlation processing means for obtaining a cross-correlation function $R_{ij}(\delta t) = \int O_{si}(t+\delta t) O_{sj}(t) dt$ between said signals $O_s$ inputted from said observation stations with a delay time, smoothing said cross-correlation function $R_{ij}(\delta t)$ by a moving average to obtain a smoothed cross-correlation function $R_{ij}(t)=\int \omega(t-\tau)R_{sij}(t)d\tau$, obtaining a point of time at which said smoothed cross-correlation function reaches a maximum as delay time $T_{ij}$, and further obtaining a half-width H of said smoothed cross-correlation function;

tomography means for calculating, as an earthquake occurrence spatial point, an intersection of a plurality of hyperboloids of two sheets drawn as loci of points at which a propagation distance difference corresponding to said delay time $T_{ij}$ is constant, with any pair of observation points defined as loci, and calculating a central position $X_t$ of a spatial distribution of seismic electromagnetic field source regions, together with an extension $\Delta X_t$;

regional seismic electromagnetic wave discriminating means for temporally matching time-series data of said seismic electromagnetic field signals $O_s$ inputted with a delay time so that said delay time is eliminated, extracting from said signals $O_s$ signals which are mutually present in an allowable arrival time interval $\Delta T_{12}$ determined on the basis of said half-width H inputted thereto from said correlation processing means, and for outputting a noiseless regional seismic electromagnetic field signal $O_r$;

regional characteristic estimating means for outputting a regional characteristic signal $C_r$ including a pulse number of said signal $O_r$ for each amplitude level and a maximum value and a minimum value of said signal $O_r$, a seismic electromagnetic field source region average central position $X_r$, extension $\Delta X_r$ and intensity distribution $I_r$, which are calculated from an intersection region of said local direction distribution data ($d_{0i}$ and $\Delta d_{0i}$, and for calculating and outputting an epicentral distance L from said observation station to a position indicated by said average central position $X_r$;

source region distribution estimating means for calculating a weighted mean of said average central position $X_r$, $\Delta X_r$ and $I_r$ from said regional characteristic estimating means, said spatial distribution central position $X_t$ and $\Delta X_t$ from said tomography means, and a seismic electromagnetic field source region data $X_i$, $\Delta X_i$ and $I_i$ calculated on the basis of said arrival beating data (d and $\Delta d$) from each of said observation stations, thereby estimating a seismic electromagnetic field source central position $X_0$, extension $\Delta X_0$ and intensity distribution $I_0$, and for transmitting said central position data $X_0$ and extension $\Delta X_0$ to said refined local characteristic estimating means of each of said observation stations;

means for estimating an earthquake magnitude $M_0$ on the basis of a quantity indicating an extension of seismic electromagnetic field source regions, which is obtained on the basis of a set of said central position data $X_0$ and extension $\Delta X_0$, said regional characteristic signal $C_r$, local characteristic signal $C_e$, refined local characteristic signal $C_f$ and epicentral distance L;

means for obtaining abnormality occurrence time $T_0$ based on a function of time and pulse numbers of said regional characteristic signal $C_r$; and means for estimating earthquake occurrence time $T_E$ by adding empirically known time $\Delta T$ to said abnormality occurrence time $T_0$ obtained on the basis of said function of said time and input pulse numbers of said characteristic signals $C_e$, $C_f$ and $C_r$.

7. An earthquake prediction system according to claim 6, further comprising synthetic decision means whereby said estimated earthquake occurrence time $T_E$ from said occurrence time estimating means, said central position $X_0$, extension $\Delta X_0$ and intensity distribution $I_0$ from said source region distribution estimating means, and said earthquake magnitude $M_0$ from said magnitude estimating means are compared with meteorological data to check whether or not there is lightning, and further compared with crustal activity monitoring data to decide reliability of the estimation of said earthquake occurrence time $T_E$, said central position $X_0$, extension $\Delta X_0$ and intensity distribution $I_0$, and said earthquake magnitude $M_0$.

8. An earthquake prediction system according to claim 6, wherein said means for estimating an earthquake magnitude calculates a value A of area on the basis of the set of said central position data $X_0$ and extension $\Delta X_0$ as a quantity indicating an extension of said seismic electromagnetic field source regions, and obtains a first estimate $M_1$ of earthquake magnitude on the basis of said value A, and wherein said means for estimating an earthquake magnitude further obtains a second estimate $M_2$ of said earthquake magnitude on the basis of said regional characteristic signal $C_r$, local characteristic signal $C_e$ and refined local characteristic signal $C_f$, together with said epicentral distance L, and finally obtains said earthquake magnitude $M_0$ by calculating a weighted mean of said estimates $M_1$ and $M_2$.

9. An earthquake prediction system according to claim 8, wherein said means for estimating an earthquake magnitude obtains said first estimate $M_1$ of said earthquake magnitude by inserting said value A of area into the following formula:

$M=a\text{Log}A+b$ (where a and b are constants) and obtains said second estimate $M_2$ by inserting said regional characteristic signal $C_r$, local characteristic signal $C_e$, refined local characteristic signal $C_f$ and epicentral distance L into the following empirical relation for earthquake magnitude:

$$M=f(C_r, C_e, C_f, L).$$

10. An earthquake prediction system according to claim 6, wherein said means for estimating earthquake occurrence time obtains said earthquake occurrence time $T_E$ by calculating a weighted mean characteristic value of a number of pulses of said characteristic signals $C_e$, $C_f$ and $C_r$ inputted per predetermined time interval to determine a weighted mean characteristic function $C_m$; obtaining an abnormality judgement criterion $C_0$ empirically set from said characteristic function $C_m$; obtaining said time $T_0$ at which said characteristic function $C_m$ exceeds said abnormality judgment criterion $C_0$ as time to judge that an abnormality has occurred; and adding said time $\Delta T$, which is empirically known to go before occurrence of an earthquake, to said time $T_0$.

* * * * *